UNITED STATES PATENT OFFICE.

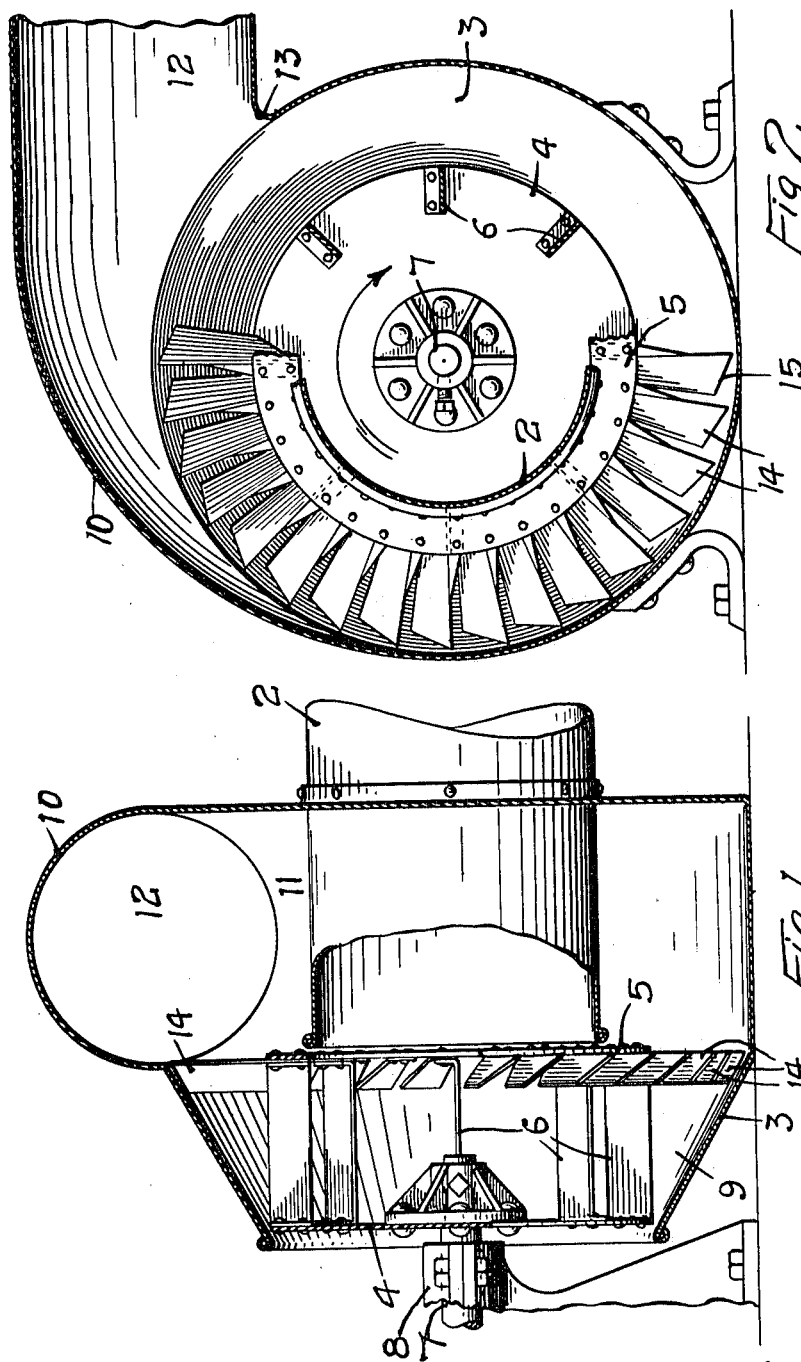

DANIEL B. MINOR, OF ST. PAUL, MINNESOTA, ASSIGNOR TO L. S. HACKNEY, OF ST. PAUL, MINNESOTA.

CENTRIFUGAL FAN.

1,020,771.  Specification of Letters Patent.  Patented Mar. 19, 1912.

Application filed September 18, 1911. Serial No. 650,028.

*To all whom it may concern:*

Be it known that I, DANIEL B. MINOR, of St. Paul, Ramsey county, Minnesota, have invented certain new and useful Improvements in Centrifugal Fans, of which the following is a specification.

My invention relates to fans designed particularly for use with ventilating apparatus and the object of the invention is to provide a fan of large capacity and one which will be practically noiseless.

Other objects of the invention will appear from the following detailed description.

The invention consists generally in various constructions and combinations, all as hereinafter described and particularly pointed out in the claims.

In the accompanying drawings forming part of this specification, Figure 1 is a sectional view through the fan casing, showing a fan with my invention applied thereto, Fig. 2 is a sectional view taken on a section line at right angles substantially to the section line of Fig. 1.

In the drawing, 2 represents a centrally arranged intake pipe communicating with a casing having flaring walls 3.

4 and 5 represent the heads of the fan, between which blades 6 are arranged at suitable intervals, preferably a considerable distance apart, as indicated in Fig. 2. These blades are of substantially the same width from end to end and are rigidly secured to the heads 4 and 5. The head 4 has a shaft 7 journaled in the bearing 8. The fan revolves within the casing and an annular chamber 9 is formed between the flaring walls 3 and the blades 6 of the fan. The periphery of the head 4 lies close to the walls 3 while the periphery of the head 5 is a considerable distance from the walls 3, forming a chamber or space increasing in width from one end of the fan to the other. At the exit of the chamber 9 the flaring walls unite with the walls 10 of an annular chamber 11 having an exit opening 12. The angle 13 where the flaring walls 3 unite with the walls 10 is located at such a distance from the blades 6 that the whirring sound incidental to centrifugal fans as usually constructed is entirely eliminated.

For the purpose of accelerating the flow of air through the chamber 9 and into the chamber 11 I provide a series of blades 14 mounted on the outer portion of the head 5 and twisted slightly to present inclined surfaces to the air currents and suck the air from the chamber 9 into the chamber 11, where a revolving movement will be imparted to the air currents, causing them to flow around the surface of the walls 10 and finally pass out through the discharge opening 12. These blades are preferably provided with beveled outer ends 15 and are so disposed in the casing that the air currents will be drawn along the flaring surface of the chamber 9 and sucked into the chamber 11 without impinging the sharp angle at the intersection of the walls 3 and 10 and without causing the disagreeable sound that is so frequently objectionable in fans of this type. I have found also that the use of these blades will so accelerate the flow of the air currents from the chamber 9 into the chamber 11 and out through the discharge opening that the capacity of the fan will be greatly increased over those of the ordinary type of the same size.

I claim as my invention:—

1. A centrifugal fan having a casing provided with a central intake opening, fan heads mounted in said casing and having fan blades between them, a series of circumferential blades mounted on one of said fan heads and projecting outwardly therefrom, said circumferential blades accelerating the flow of air through said casing and said casing having an annular discharge chamber into which the air is directed by said blades.

2. The combination, with a casing having intake and discharge openings, of a revolving fan located therein, said fan having blades extending parallel substantially with its axis and also having a series of blades lying in a plane at right angles substantially to the axis of said fan and projecting outwardly beyond said blades.

3. The combination, with a casing having intake and discharge openings and provided with flaring walls, of a fan journaled in said casing and inclosed by said flaring wall and comprising heads and blades between said heads, one of said heads being contiguous to said flaring wall and the other being disposed a considerable distance from said wall, an annular chamber being formed between said blades and said flaring wall, a series of blades carried by said last named head and projecting outwardly toward said flaring wall and between said outlet opening and said chamber and operating to accelerate the flow of the air currents through said chamber toward said outlet opening.

4. The combination, with a fan casing having a central intake opening and flaring walls and an annular chamber terminating in a discharge opening, of a fan located within said casing at one side of said annular chamber and inclosed by said flaring walls, said fan having a series of primary blades, there being an annular chamber formed between said blades and said flaring walls, and a series of secondary blades carried by said fan and disposed between said first and second named annular chambers and operating to accelerate the currents of air through said fan and into said first named annular chamber.

5. The combination, with a fan casing having an air intake and discharge opening, of a centrifugal fan mounted therein and provided with heads, and a series of plates arranged at intervals between said heads and a series of fan blades projecting outwardly from one of said heads and presenting inclined surfaces to the air currents and operating to accelerate the currents of air through said fan toward said discharge opening.

6. The combination, with a fan casing, cone-shaped in form and having open ends, of a centrifugal fan journaled in said casing and provided with heads and blades between said heads, one of said heads filling, substantially, one open end of said casing and considerable space being provided between the other head and the opposite end of said casing, and blades carried by said fan and projecting into said space.

7. The combination, with a fan casing having an intake opening and flaring walls and a chamber terminating in a discharge opening, of a fan located within said casing and having a series of primary blades therein, a chamber being formed between said blades and said flaring walls and a series of secondary blades carried by said fan and disposed between said first and second named chambers and operating to accelerate the currents of air through said fan and into said first named chamber.

In witness whereof, I have hereunto set my hand this 13th day of September 1911.

DANIEL B. MINOR.

Witnesses:
ASHLEY COFFMAN,
W. J. ELLIOTT.